United States Patent [15] 3,701,020

De Vito [45] Oct. 24, 1972

[54] PHASE CODED RF PULSE GENERATOR

[72] Inventor: Peter A. De Vito, Chelmsford, Mass.

[73] Assignee: The United States of America as represented by the Secretary of the Air Force

[22] Filed: July 15, 1970

[21] Appl. No.: 54,953

[52] U.S. Cl. ..................325/121, 325/126, 325/163, 330/47, 331/5

[51] Int. Cl. ..............................................H04b 1/04

[58] Field of Search ........325/121, 126, 163; 330/47; 331/5

[56] References Cited

UNITED STATES PATENTS 3,445,772 5/1969 Harmon et al. .........325/163 X 2,576,599 11/1951 Hansell........................330/47

2,881,270 4/1959 Brown.........................330/47

*Primary Examiner*—Robert L. Griffin

*Assistant Examiner*—Richard K. Eckert, Jr.

*Attorney*—Harry A. Herbert, Jr. and Willard R. Matthews, Jr.

[57] ABSTRACT

The low power RF injection pulses of an injection-locked pulsed magnetron are phase controlled in coded sequence to provide high power phase coded coherent RF output pulses. The magnetron transmits pulses having identical phase patterns as those of the injected signals. Complex coding is achieved by multiple alternate 180° phase shifts and by varying degrees of phase shifts within individual pulses.

1 Claim, 9 Drawing Figures

INVENTOR
PETER A. DE VITO
BY Harry A. Herbert Jr. and
Willard R. Matthews
ATTORNEYS

PHASE CODED RF PULSE GENERATOR

BACKGROUND OF THE INVENTION

This invention relates to phase shifting of high power RF pulses, and in particular to phase pattern control of injection locked pulsed magnetrons.

There are currently many requirements for phase shifted or phase coded high power RF signals. Phased array radar systems, for example, require phase shifting of high power signals. This is commonly accomplished at the high power level by means of switched delay lines. The losses inherent in such delay lines are appreciable. Significant savings could be realized in power, size and system complexity if the phase shifting could be accomplished at a low power level.

Phase coded high power RF signals, such as are used in IFF systems, are achieved in prior art systems at the expense of circuit complexity, multiple amplifier stages, and losses inherent in high power phase shifting devices.

There is therefore a current need in the microwave art for means for providing phase shifting and coding of RF signals, at a low power level.

Such a pulse coding means would find particular utility in search radar systems wherein coded pulses could be used to distinguish between true target echo returns and false target echoes generated by enemy aircraft countermeasure systems.

SUMMARY OF THE INVENTION

The present invention comprehends a unique method of generating and controlling varied phase patterns in a magnetron RF output pulse. Essentially the technique consists of generating a phase pattern in the output pulses of a low power stable oscillator and injecting this low power signal with its distinctive phase characteristic into the interaction circuit of a magnetron. It has been discovered that a positive pulsed magnetron, locked to a lower power oscillator, will transmit at a considerably higher power a pulse with the identical phase pattern as that of the injected signal. A gated electronic phase shifter is used to generate a predetermined phase pattern in the pulsed low power injection signal. If the frequencies of the magnetron and the stable low power oscillator are sufficiently close, i.e. within the locking bandwidth, the magnetron will synchronize with a lock to the injection source. The locked magnetron in turn transmits pulses with the same phase pattern as the injected signal. Phase coherence is established by the injection locking mechanism in the pulsed magnetron.

It is a principal object of the invention to provide a new and improved phase coded RF pulse generator.

It is another object of the invention to provide a phase coded RF pulse generator wherein phase manipulation is accomplished at a low power level.

It is another object of the invention to provide a phase coded high power RF pulse generator that does not require output amplification circuits.

These, together with other objects, features and advantages of the invention, will become more apparent from the following detailed description when taken in conjunction with the illustrative embodiment in the accompanying drawings.

DETAILED DESCRIPTION OF THE PREFERRED EMBODIMENT

Injection phase locking is a known technique for oscillator stabilization whereby a small stable locking signal is fed into the interaction circuit of the oscillator to be stabilized. Recent advances in magnetron design have reduced the injection power required to produce locking in a pulsed magnetron to a practical level. Injection locked pulsed magnetron systems of this type are disclosed in the publication, Some Properties of an Injection-Locked Pulsed Magnetron in a Coherent Echo Detection System, By M. H. Seavy, Electronics Letter, Vol. 3, No. 8, August 1967.

In essence, the present invention is based on the newly discovered concept that phase changes in the high power magnetron output pulses follow precisely and coherently any phase changes that occur in the low power injection pulses. This novel concept has been put to practical effect in the phase coded RF pulse generator of FIG. 1.

Figure 1:
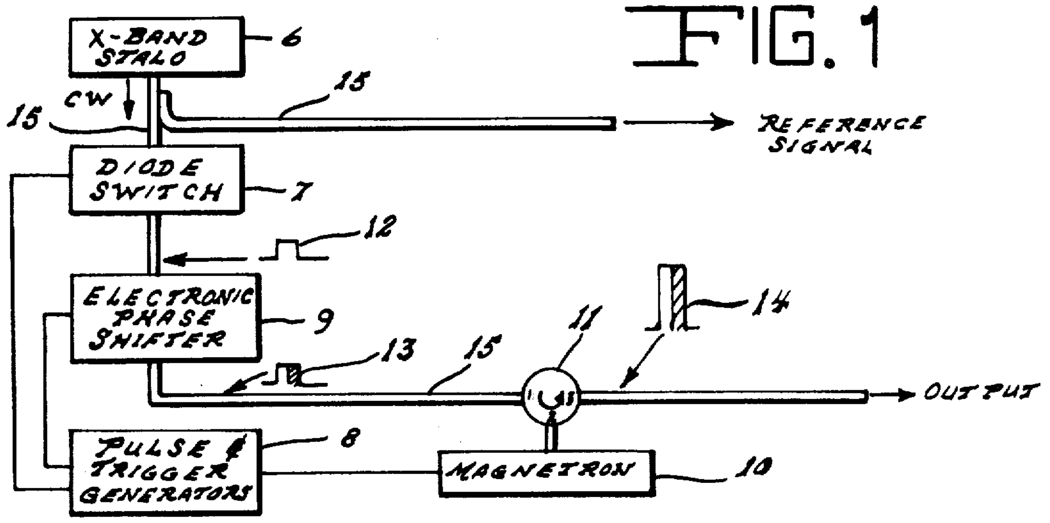
FIG. 1 is a block diagram of one presently preferred embodiment of the phase coded RF pulse generator of the invention.

Referring now to FIG. 1, there is illustrated a block diagram of a coherent X band system employing a phase controlled injection locked magnetron that employs the principle of the invention. A CW injection signal is generated by X band low power stable oscillator (STALO) 6. Stable oscillator 6 may be a crystal oscillator-harmonic generator, an atomic frequency standard, a highly stable klystron oscillator or other appropriate source. The CW output of stable oscillator 6 is used as a reference signal and is also pulsed by means of diode switch 7. The pulsed output of diode switch 7 is injected into the interaction circuit of magnetron 10 by means of waveguide circuit 15 and circulator 11. Circulator 11 provides for both inputs of the low power injection pulses 12 into the magnetron and output of the high power magnetron output pulses 14. Magnetron 10 can advantageously be of the positive pulse (grounded cathode) type in order to achieve improved coupling and higher injection ratios. The invention is nevertheless operable with other types of high power microwave oscillators and different design specifications may require alternative devices. For instance, a negative pulse magnetron may be used if wider bandwidth is a controlling parameter. Phase control of the injection pulses is accomplished by means of electronic phase shifter 9. Electronic phase shifter 9 can be a ferrite slug or other appropriate microwave device. Synchronization of the system and programming of injection pulse length and frequency and phase shifting is accomplished in a conventional manner by means of pulse and trigger generators 8.

A schematic representation of the phase patterns of the low power injection signal together with the detected echo produced by the magnetron RF output is shown in FIGS. 2 through FIGS. 5*a*. The detected signal, assuming square law detection, has an envelope amplitude of $2V_RV_S$, where $V_R$ is the RF reference voltage and $V_S$ is the RF signal voltage in an echo. When the echo signals are coherently related to the CW reference signal, the detected signal becomes $2V_RV_S \cos \phi$ where $\phi$ is the phase angle between the reference signal and the echo signal.

Figure 2:
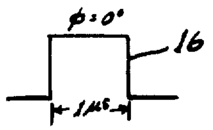
FIG. 2 illustrates a 0° phase shifted output pulse of the RF pulse generator of FIG. 1.
Figure 3:
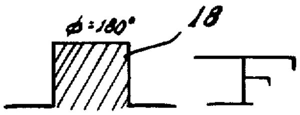
FIG. 3 illustrates a 180° phase shifted output pulse of the RF pulse generator of FIG. 1.
Figure 2A:
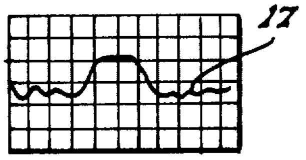
FIG. 2*a* illustrates the detected echo of the pulse of FIG. 2.
Figure 3A:
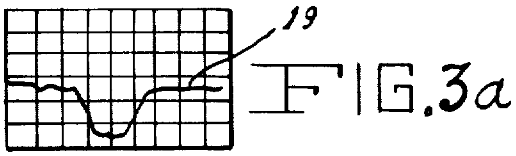
FIG. 3*a* illustrates the detected echo of the pulse of FIG. 3.

In FIG. 2, the injection pulse 16 has a 0° phase shift. In FIG. 3, pulse 18 illustrates that the phase of the entire injection pulse is changed 180°. In turn, the highest power output pulse of the magnetron, in this particular case, 180° phase shift, instantaneously changes by 180°. This is verified by the 0° phase shift of the echo return 17 (FIG. 2*a*) in the first instance, and by the 180° phase shift of the echo return 19 (FIG. 3) in the second instance. By sequential gating of the electronic phase shifter 9, alternate pulses can be made 180° out of phase or any combinational phase scheme can be produced within the pulse train. Since a 180° phase shift represents an extreme case imposed upon the magnetron, an infinite number of phase patterns, between 0° and 180°, can be attained by employing different phase shifters and gating sequences.

Figure 5:
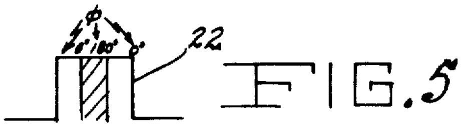
FIG. 5 illustrates an output pulse of the RF pulse generator of FIG. 1 having two 180° intrapulse phase shifts; and, FIG. 5*a* illustrates the detected echo of the pulse of FIG. 5.
Figure 4:
FIG. 4 illustrates an output pulse of the RF pulse generator of FIG. 1 having a single 180° intrapulse phase shift.
Figure 5A:
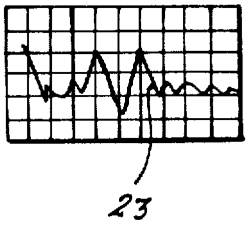
Figure 4A:
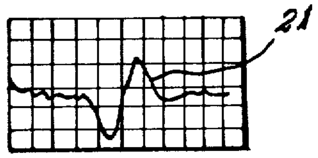
FIG. 4*a* illustrates the detected echo of the pulse of FIG. 4.

In order to produce more sophisticated phase patterns, phase changes within the pulse itself are employed. In FIG. 4, the phase of injection signal 20 is changed midway between the rise and fall of each 1 microsecond pulse. The locked magnetron, in turn, transmits a pulse with the same pattern as injection signal 20. This is substantiated by the detected echo 21 (FIG. 4*a*). Injection pulse 22 of FIG. 5 shows two 180° phase shifts between the second and last third of the pulse. Echo 23 of FIG. 5*a* again illustrates the effect of this on the magnetron output pulse. By increasing the width of the transmitted pulse and by having a number of 180° phase changes, for example 6 to 10, within each pulse a phase digital-coded pulse would be produced.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. A high power phase coded RF pulse generator comprising,
   - a stable low power RF source,
   - a diode switch adapted to pulse the output of said RF source,
   - an electronic phase shifter adapted to effect multiple 180° intrapulse phase shifts in pulses generated by said RF sources,
   - a grounded cathode magnetron oscillator,
   - a pulse generator connected to said magnetron oscillator and adapted to effect pulsed operation thereof,
   - a first microwave transmission line adapted to apply the phase shifted pulsed output of said electronic phase shifter to the interaction circuit of said magnetron oscillator,
   - a second microwave transmission line adapted to transmit the output of said magnetron oscillator,
   - a circulator in interconnecting relationship with said first and second microwave transmission lines, and
   - a trigger generator adapted to synchronize the operations of said diode switch, said electronic phase shifter, and said pulse generator to effect injection locked pulsed magnetron oscillator operation.

* * * * *